Jan. 14, 1964 D. EDWARDS 3,117,353
PANEL MOUNTING MEANS
Filed June 7, 1960
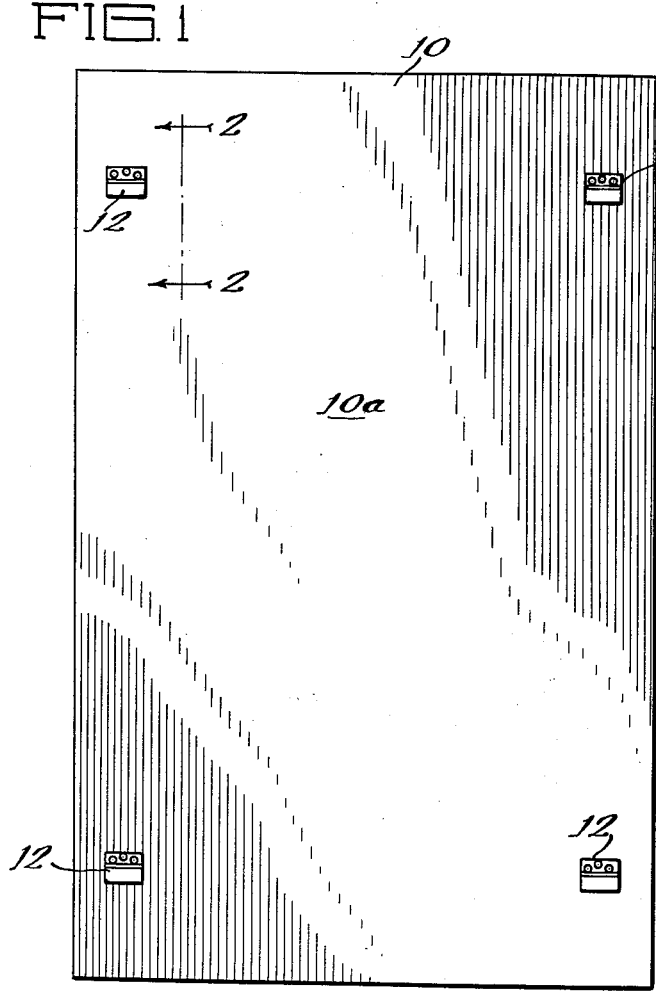
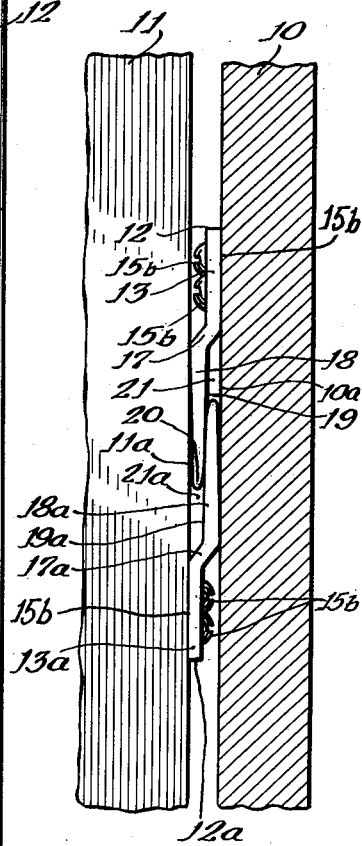
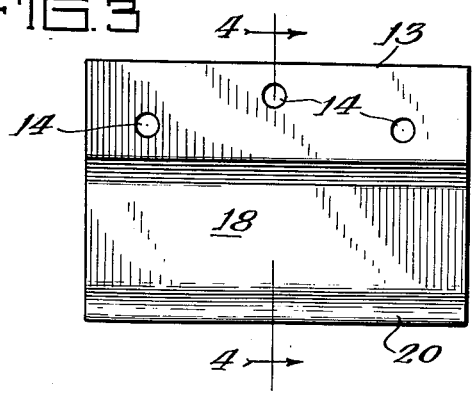
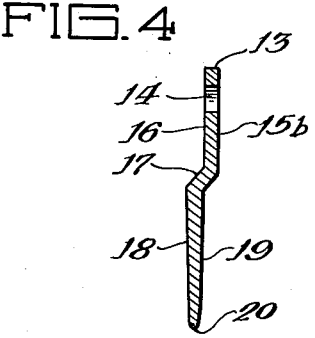
Inventor:
Donald Edwards
By Hofgren, Brady, Wegner,
Allen & Stellman
Attorneys

United States Patent Office 3,117,353
Patented Jan. 14, 1964

3,117,353
PANEL MOUNTING MEANS
Donald Edwards, Chicago, Ill., assignor to Woodwork
Corporation of America, a corporation of Illinois
Filed June 7, 1960, Ser. No. 34,540
1 Claim. (Cl. 20—92)

This invention relates to a panel mounting means, and in particular it relates to a hook or clip type construction for securing a panel in facing relationship to a base element.

The principal object of the invention is to supply a very inexpensive, simple clip or hook for hanging wood paneling on a wall, or for securing a cabinet panel in place, in such a way that the panelling is secure and firm in all directions, and yet is easily removable. The clip is also suitable for hanging a prefabricated cabinet upon a pre-existing wall.

Another object of the invention is to provide a hook structure which is very easily installed, and which eliminates any need for precise location of the hook element.

Still another object of the invention is to provide a hook structure which may be fabricated by an extrusion process.

Still another object of the invention is to provide a hook structure which takes advantage of the surface frictional characteristics of extruded aluminum to provide a strongly locking wedge construction.

The invention is illustrated in a preferred embodiment in the accompanying drawings in which:

FIG. 1 is a plan view of a panel provided with four hooks constructed in accordance with the invention;

FIG. 2 is a fragmentary section on an enlarged scale taken substantially as indicated along the line 2—2 of FIG. 1, showing the panel hung on a base element;

FIG. 3 is a front elevational view of a single hook member; and

FIG. 4 is a section taken substantially as indicated along the line 4—4 of FIG. 3.

Referring to the drawings in greater detail, a wood panel element 10 is secured in facing relationship to a base element 11 by means of a plurality of hooks 12, the hooks being arranged in pairs so that a hook 12 on the panel element engages with a hook 12a on the base element.

Each hook has a wide attaching flange 13 provided with holes 14 to receive screws 15 by means of which the hook is secured either to the panel element or to the base element. As best seen in FIGS. 2 and 4, each attaching flange has an inner face 15b and an outer face 16 which are parallel, and extending along the entire width of the flange at one margin is a short inclined portion 17 from which a carrying arm 18 extends between planes which are parallel to the faces 15b and 16 of the attaching flange. Carrying arm 18 extends along the entire width of inclined portion 17 and has an inner face 19 which is inclined very slightly outwardly from the plane of the base element, the angle being 4° from the plane of the face 16. Carrying arm 18 has a rounded tip, or free end 20.

It is plain from FIG. 2 that when the hook 12 is secured to panel 10 the inclined inner face 19 of carrying arm 18 cooperates with the confronting face 10a of panel 10 to form a very gradually tapered, shallow wedging recess 21 the length of which from inclined portion 17 of the free end of the carrying arm is relatively great as compared with the depth from the arm to the face; and that the inner face 19a of carrying arm 18a of the hook 12a cooperates with a facing surface 11a of base element 11 to form a wedging recess 21a which is identical with the wedging recess 21. FIG. 2 also shows that from the inclined portion 17 for a substantial part of the distance to the free end 20, each carrying arm is thicker than the distance from the face 19 to a projection of the plane of face 15b, so the fingers wedge firmly in the recesses long before the free ends 20 can bottom against the inclined portions 17. Furthermore, even substantial wear or grooving of the surfaces 10a and 11a does not cause the fingers to be loose in the wedging recesses.

Panel 10 may be very easily hung upon base 11 by placing the outer face of finger 18 against surface 11a of the base 11 and sliding the panel downwardly until carrying arm 18 and carrying arm 18a are wedged, respectively, in the wedging recesses 21a and 21.

Since all the hooks are identical they may be conveniently fabricated in large quantities by extruding aluminum through a die of suitable shape, and then cutting the aluminum extrusion into desired lengths.

The surface characteristics of aluminum are such that when two hooks are engaged as illustrated in FIG. 2 of the drawings there is a very substantial frictional engagement between the inner faces 19 and 19a of the two carrying arms 18 and 18a.

Installation of the hooks upon the panel element and base element requires no very accurate workmanship, since the hooks will engage properly even if only a small side marginal part of the hook 12 is actually engaged with the hook 12a; and even if one or both hooks of a pair is mounted at a slight angle with respect to the vertical it does not interfere with the proper mounting of the panel upon the base.

The foregoing detailed description is given for clearness of understanding only and no unnecessary limitations are to be understood therefrom, as some modifications will be obvious to those skilled in the art.

I claim:

In an assembled structure, in combination: a base element; a rigid supporting hook of substantial width secured to a facing surface of the base element, said supporting hook consisting of a short length of a metal extrusion and including an attaching flange having a planar inner face bearing on the base element, said attaching flange terminating at and merging into a short inclined portion that extends along a margin of said flange and outwardly from said inner face, and a carrying arm extending along the margin of said inclined portion which is remote from the flange, whereby said arm is offset a short distance from said facing surface of the base element, said arm extending the full width of the attaching flange and having an inner face at a slight angle outwardly from said facing surface of the base element and cooperating with said surface to provide a very gradually tapered, shallow depth wedging recess of substantial width, and said arm having a rounded free end, the length of said recess compared to its shallow depth being relatively great, said carrying arm for a substantial part of the distance from its offset to its free end being thicker than the shallower part of said wedging recess, the line of merger between said attaching flange and carrying arm, and the outer end of said carrying arm both providing straight, unbroken surfaces; a wood panel element; and a mounting hook which is identical with and complementary to said supporting hook and mounted on a surface of the panel element opposed to said facing base element surface, said mounting hook having at least a side marginal part of its carrying arm frictionally wedged into the supporting wedging recess between and in contact with said inner face of the supporting hook carrying arm mounted on the base element and said facing surface of the base element.

References Cited in the file of this patent

UNITED STATES PATENTS

| | | |
|---|---|---|
| 1,648,591 | Repay | Nov. 8, 1927 |
| 1,858,648 | Wahnsiedler | May 17, 1932 |
| 2,324,710 | Livar | July 20, 1943 |
| 2,414,060 | Rausch | Jan. 7, 1947 |
| 2,453,221 | Haden | Nov. 9, 1948 |
| 2,656,550 | Loeb | Oct. 27, 1953 |
| 2,766,488 | Danielson | Oct. 16, 1956 |
| 2,986,282 | Brink | May 30, 1961 |

FOREIGN PATENTS

| | | |
|---|---|---|
| 219,689 | Germany | 1910 |
| 102,783 | Austria | Mar. 10, 1926 |
| 242,307 | Switzerland | 1946 |